United States Patent [19]
Beretsky et al.

[11] 3,830,223
[45] Aug. 20, 1974

[54] METHODOLOGY AND APPARATUS FOR NON-INVASIVE BIOPHYSICAL DIAGNOSIS

[75] Inventors: Irwin Beretsky, New York; Bernard Lichtenstein, Yorktown Heights, both of N.Y.

[73] Assignee: Technicon Instruments Corporation, Tarrytown, N.Y.

[22] Filed: Sept. 18, 1972

[21] Appl. No.: 290,183

[52] U.S. Cl.......... 128/2 V, 128/2.05 F, 128/2.05 Z
[51] Int. Cl..................... A61b 5/02, A61b 10/00
[58] Field of Search .. 128/2 V, 2 R, 2.05 R, 2.05 F, 128/2.05 Z, 2.1 Z, 24 A; 73/67.1, 67.9

[56] References Cited
UNITED STATES PATENTS

| | | | |
|---|---|---|---|
| 3,156,110 | 11/1964 | Clynes | 128/2 V X |
| 3,640,271 | 2/1972 | Horton | 128/2.05 F X |
| 3,690,158 | 9/1972 | Lichtenstein | 128/2 V |
| 3,695,252 | 10/1972 | Gordon | 128/24 A X |

OTHER PUBLICATIONS

Kikuchi, Y. et al., Japan Electronic Engnrg., Oct. 1970, pp. 53–60.

*Primary Examiner*—Kyle L. Howell
*Attorney, Agent, or Firm*—Stephen E. Rockwell; S. P. Tedesco

[57] ABSTRACT

New and improved methodology and apparatus for non-invasive biophysical diagnosis are disclosed and comprise the ensonification of body parts with multi-frequency energy pulses in predetermined timed sequence, the detection of the resultant echo pulses, the processing of the latter to provide signals indicative of the impedance of the body part, the referencing of said signals to the biophysical cycle of the body part, and the real time display of said signals in the form of an impedance profile of said body part.

21 Claims, 21 Drawing Figures

METHODOLOGY AND APPARATUS FOR NON-INVASIVE BIOPHYSICAL DIAGNOSIS

BACKGROUND OF THE INVENTION

1. Field of the Invention.

This invention relates to new and improved methodology and apparatus for non-invasive biophysical diagnosis.

2. Description of the Prior Art.

Although a very wide variety of prior art non-invasive methodologies do of course exist for biophysical diagnosis, it may be understood that none exist which can safely accomplish non-invasive, dynamic detection of intra organ blood flow, and which can non-invasively and dynamically differentiate between active contraction and passive stretch or tension in any part of the body, with sufficiently high degrees of reliability and accuracy (and/or resolution) as to make the diagnostic results provided thereby truly meaningful in every instance. More specifically, and taking for example even the most skillful and determined analysis of the electrophysiological evidence as provided by an EKG, it may be understood that the same simply cannot provide information enabling the positive very early detection of coronary atherosclerosis, or the location and quantification of the effects thereof insofar as alteration in the contractility of the heart is concerned. Taking, for example, other biophysical areas, it may be understood that there is currently no known non-invasive methodology for the direct quantification of intra-renal blood flow, or for the direct quantification of the tension profile in the bladder or uterine tension during labor. As a further example of the relevant deficiencies of the prior art, it is not believed that there is in existence any methodology or apparatus enabling the positive, non-invasive detection of a pulsatile tumor which is pathognomonic of a vascular tumor to imply either cancer or hemangioma. In addition, no prior art methodology or apparatus are known which can non-invasively provide a high resolution, real time display of a functioning body organ in situ without risk of harm to the patient or operator.

OBJECTS OF THE INVENTION

It is, accordingly, an object of this invention to provide biophysical diagnosis methodology and apparatus for the positive, non-invasive dynamic detection and quantification of intra-organ blood flow.

Another object of the invention is the provision of methodology and apparatus as above for the positive, non-invasive dynamic detection and quantification of, and or differentiation between, active contraction and passive stretch or tension in any relevant part of the body to thereby enable the positive determination of the contractility thereof.

Another object of the invention is the provision of methodology and apparatus as above for the positive, non-invasive display of a functioning body organ in situ in real time with a high degree of resolution.

Another object of the invention is the provision of methodology and apparatus as above which may be operated totally without risk of harm to the patient and operator.

A further object of the invention is the provision of methodology and apparatus as above which, because of the non-invasive nature thereof, may be widely applied on a truly clinical basis.

SUMMARY OF THE INVENTION

The new and improved methodology and apparatus of the invention for the non-invasive examination of body parts to indicate the biophysical characteristics thereof comprise the selective ensonification of at least a portion of a body part with multi-frequency energy pulses in predetermined timed sequence, the detection of the resultant echo pulses, the processing of the latter to provide signals indicative of the impedance of the thusly ensonified body part, the time referencing of said signals to the biophysical cycle of the ensonified body part, and the display of said signals to provide an impedance profile of said body part portion which is indicative of the biophysical characteristics of interest. As specifically disclosed herein, the methodology and apparatus of the invention make use of broad band ultrasound acoustic pulses for ensonification, and converts the resultant echo pulses into electrical signals for real time display of the impedance profile on a CRT or like display device. The use of sterrable pulse transmission and receiving means is also disclosed and makes possible the scanning of the body part by the ensonifying pulse beam and, in conjunction with Z axis modulation, the real time display of cross sections of the body part in situ. A specific application of the invention to noninvasive cardiovascular diagnosis is disclosed and comprises the interrogation of localized myocardial sections at the respective commencements of the diastolic and systolic phases of the cardiac cycle to thus make possible the non-invasive determination of the overall contractility of the heart, and enable the detection of very early cardiovascular disease.

DESCRIPTION OF THE DRAWINGS

The above and other objects and advantages of the invention are believed made clear by the following detailed description thereof taken in conjunction with the accompanying drawings wherein.

DETAILED DESCRIPTION OF THE INVENTION

Figure 1:
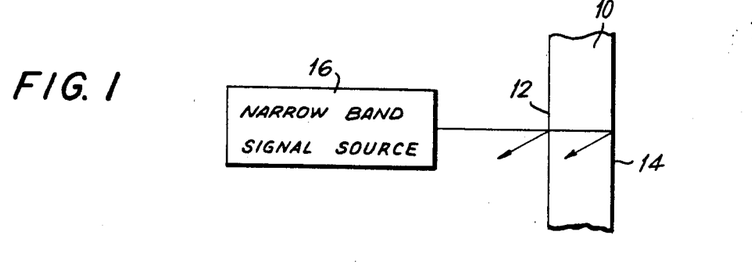
FIG. 1 is a schematic diagram of the ensonification of a structure in accordance with the prior art.
Figure 2:
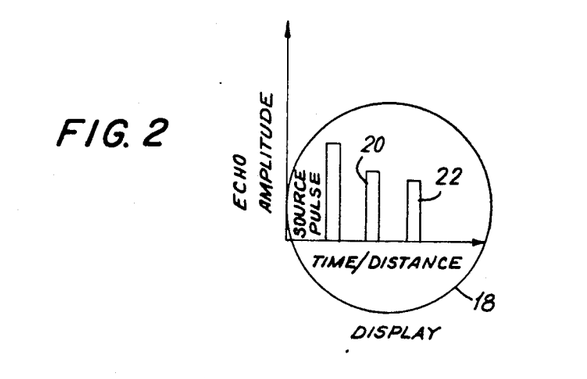
FIGS. 2 and 3 are respectively diagrams of the displays which may be provided by the structural ensonification of FIG. 1.
Figure 3:
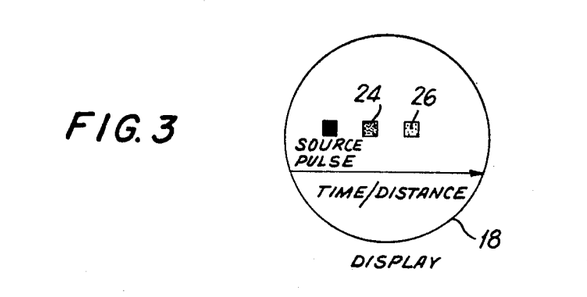

Referring now to FIGS. 1 and 2 and 3, which illustrate the utilization of prior art acoustical interrogation techniques, it may be understood that the acoustical interrogation of a structure 10, having surfaces 12 and 14, by the ensonification thereof with narrow band ultrasound signals from a source 16 will produce on an A-mode scan on an oscilloscope or like CRT display device 18 a set of echoes or return signals 20 and 22 in the form of the depicted vertical traces which represent in real time the various acoustical interfaces displayed by said structure. The amplitude of each of said vertical traces is proportional to the intensity of the echo which produces the same, while the time spacing therebetween is a measure of the different trace arrival times and, through assumption of a substantially constant velocity of sound through the structure, will enable approximation of the structure dimension. The clear display of echoes 20 and 22 requires that the levels thereof be well above the background noise level, and that the same are at least one source pulse width apart to prevent overlapping, thus making clear that boundary resolution is pulse-width limited and will improve with narrowing of the same. Frequently, the echoes are electronically "viewed" 90° from the position of FIG. 2, or "head on" as depicted in FIG. 3 to present dots 24 and 26 of varying intensity which is proportional, in each instance, to echo intensity. The significant disadvantages of this method of narrow band acoustical interrogation for non-invasive biological examination are believed well known by those skilled in this art to include generally low resolution, low signal to noise ratio, difficulty in determining the origin of echoes, and difficulty in determining an optimum threshold setting.

Figure 4:
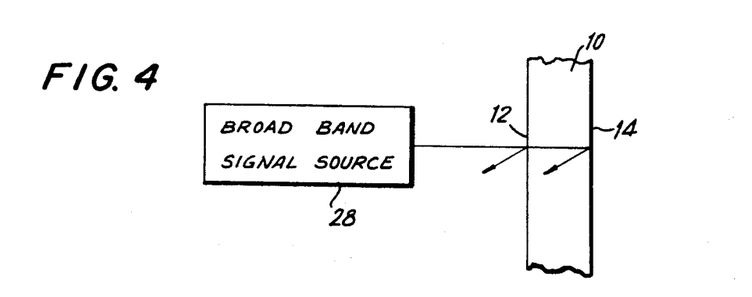
FIG. 4 is a schematic diagram of the ensonification of a structure in accordance with the teachings of th invention.
Figures 5, 6:
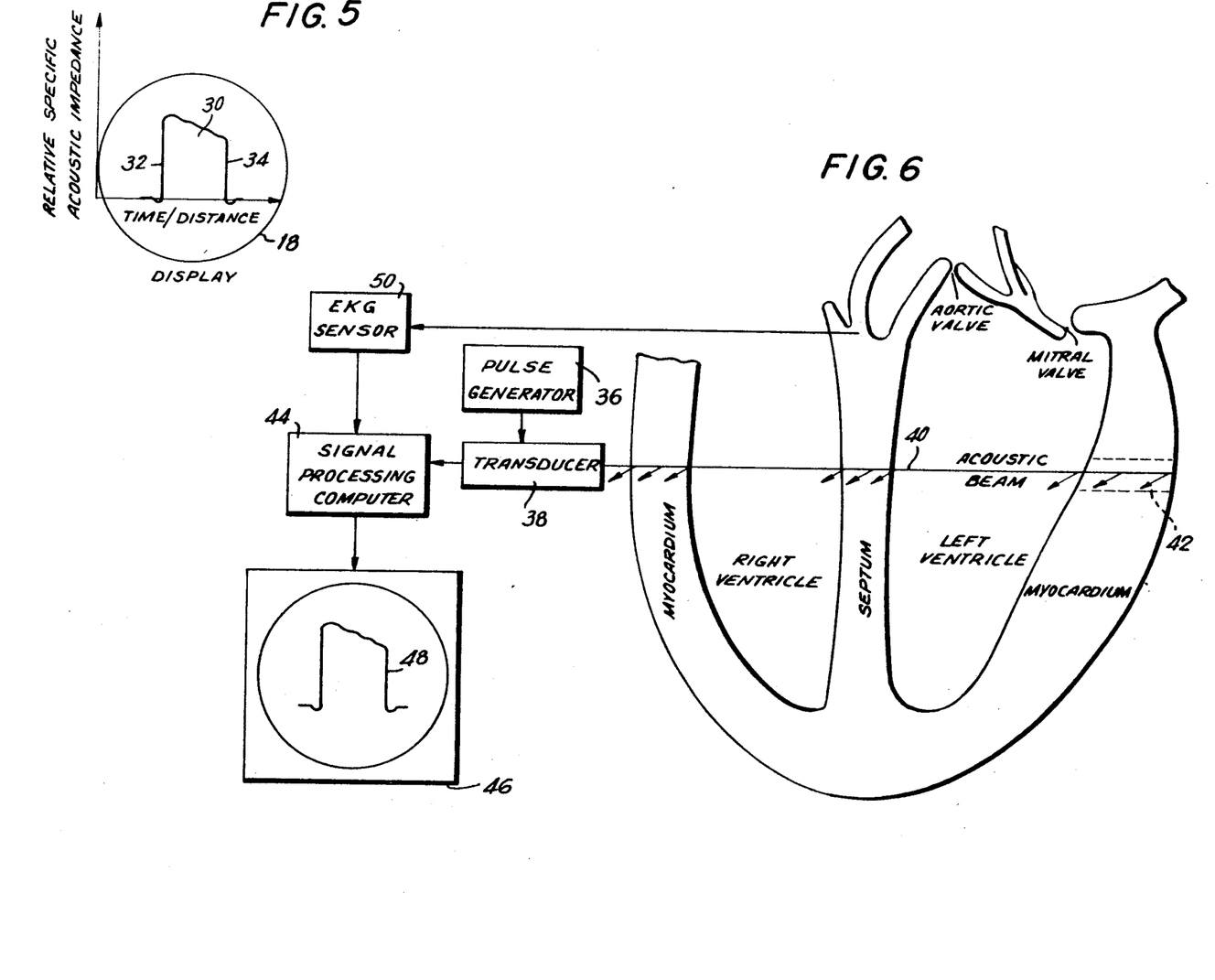
FIG. 5 is a diagram of an impedogram display provided by the structural ensonification of FIG. 4.
FIG. 6 is a schematic diagram of an application of the invention to the non-invasive examination of a localized myocardial section.

The ensonification of the structure 10 by broad band ultrasound pulse signals of very narrow pulse width from a signal source 28, and the attendant real time display of the relative specific acoustical impedance (the product of the interrogated material density and the speed of sound in the interrogated material as referenced to said product in a standard material) of said structure as impedogram or impedance profile 30 on an A-mode scan on oscilloscope 18, both as utilized in the methodology and apparatus of this invention, are depicted respectively in FIGS. 4 and 5, and such display may be understood to be made possible through appropriate electronic processing of the echoes or return signals as described in greater detail hereinbelow. In this instance, the major rise and fall points 32 and 34 of curve of impedogram 30 may be understood to coincide substantially on the time/distance axis with the acoustical interfaces presented by structure surfaces 12 and 14, while the amplitude of impedogram 30 at any time/distance points will be a direct representation of the relative specific acoustical impedance encountered by the broad band signal at a substantially corresponding point in the structure 10. This is to say that said impedogram will provide a measure of the relative specific acoustical impedance of the structure 10 as a continuous function of the time/distance relationship of the acoustical pulse relative to said structure.

Since broad-band acoustical pulse signals of very narrow pulse width are utilized to substantially inhibit pulse overlapping and enable detection of very small structural changes within structure 10 which are of greater extent than the spatial extent of the pulse, very high display resolution is made possible, while the greater precision of the broad band signal will enable the display and identification of small changes in the acoustical impedance of structure 10 throughout the latter. As a result, particularly detailed acoustical interrogation of the structure 10 is made possible and anomalies therein in the nature, for example of structural differences in adjacent sections of the structure 10, may be readily detected by the respective ensonifications thereof as described and the simple comparison of the amplitudes of the resultant acoustical impedance echoes or return signals as should be obvious.

An application of the methodology and apparatus of the invention to real time, non-invasive, dynamic cardiovascular diagnosis through utilization of the acoustical determination of specific heart tissue impedance is illustrated schematically in FIG. 6 and may be seen therein to comprise the generation of the broad band, narrow width signal pulses of interest in electrical signal form by signal generation means 36, the application thereof to transducer 38 for transformation into a beam 40 of acoustical pulses of appropriate broad band, narrow width configuration, the ensonification as indicated by said beam of a localized section 42 of the myocardium or heart muscle by proper direction of said beam through the body of the patient (as through the sternum or breastbone) as described in greater detail hereinbelow, the reception of the resultant acoustical echoes or return signals from myocardium section 42 by transducer and retransformation thereof into appropriately configured electrical pulse signals for application to signal processing computer 44 for processing therein in accordance with basic deconvolution techniques as described in greater detail hereinbelow to provide signal pulses indicative of the specific acoustical impedance of the myocardium section 42 of interest, and the application of said last-mentioned signal pulses to CRT display device 46 to display in real time the impedogram 48 of said acoustic impedance. The biophysical cycle of the heart under acoustical interrogation is sensed as indicated in well known manner by EKG sensor 50 and applied to signal processing computer for time referencing of the impedogram 48 thereto. Thus, the exact point during the heart cycle at which the impedogram in question occurs may, in each instance, be readily determined.

Prior to the detailed description of the illustrative utilization of the methodology and apparatus of the invention in the non-invasive diagnosis of a number of different cardiovascular malfunctions as may be ascertained by acoustical interrogation of localized sections of the myocardium, it is believed well to make clear that, in general, the relative specific acoustical impedance of biological tissue to acoustical pulses is related to the type of tissue as determined, for example, by tissue density, and to the molecular bonding thereof. Thus, for example, it may be understood that myocardial tissue which is contracting due to molecular coupling initiated by neurobiochemical changes at the cellular level during the systolic phase of the heart cycle, will display an increase in effective acoustical impedance. This is to say that the isometric contraction through molecular bonding of the myocardium and production of tensile stresses therein during systole will increase the effective acoustic impedance thereof. Thus detection and analysis of this increase in myocardial impedance will enable the non-invasive evaluation of myocardial and other body muscle contractility in real time to very significant advantage as described in detail by Dr. E. Sonneblick et al in the paper "Ventricular Function: Evaluation of Myocardial Contractility In Health And Disease" as published in 1970 in Vol. 12, pp. 449–466 of "Progress in Cardiovascular Diseases," and their paper "Mechanisms Of Contraction Of The Normal and Failing Heart" as published in 1967 in Vol. 277, pp. 794–800, 853–863, 910–920, 962–971 and 1012–1022 of the "New England Journal of Medicine."

An analog of this concept is a purely mechanical system is believed provided by the following example. It is known that the midpoint deflection of a beam of given flexural rigidity, which is supported at both ends and subjected to a midpoint load, is inversely related to its modulus of elasticity. If this same beam were axially pre-stressed in the manner of the tightening of a violin string, it may be understood that the deflection caused by the same midpoint load application will decrease because the beam will now behave as if its modulus of elasticity were increased above its original or unstressed baseline value, and the extent of this increase will be determined in part by the physical and molecular properties of the material from which the beam is constructed. Since the acoustic impedance of a material is approximately equal to the square root of the product of the modulus of elasticity and the density of the material, it may be understood that the effect of, for example, an increase in modulus of elasticity upon impedance may be negated, or even superseded, by a sufficiently large attendant decrease in density to result in an overall decrease in impedance. Alternatively, an increase in material density may be negated, or even superseded, by a sufficiently large attendant decrease in modulus of elasticity to again result in an overall decrease in impedance. As a result, it is believed made clear that changes in the impedance of a material will, in each instance, be dependent upon the interrelationship of the changes in the material density and modulus of elasticity to thus, for example, make clear that the stressing of a material or increase in the density thereof will not, of necessity, increase the impedance thereof.

In addition to the above, it may be understood that the direction of flow of oxygenated blood from the coronary arteries through the ventricular wall is normally through the penetrating epicardial vessels which penetrate the myocardium and extend transmurally therethrough. The introduction of blood to and through these vessels to the myocardium will also produce a detectable change in the effective acoustic impedance thereof as the blood is introduced thereto, and the detection of these blood-flow induced changes in myocardial impedance will also have very significant implications in the overall evaluation of the contractility of the heart.

Figure 7:
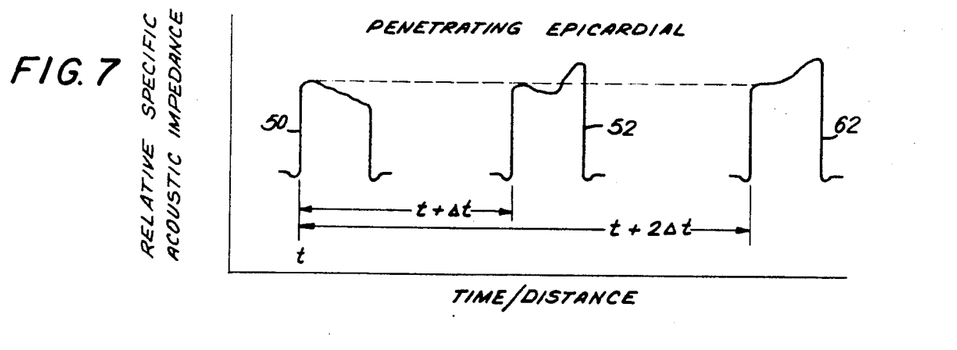
FIGS. 7, 8 and 9 are respectively diagrams of the impedograms provided by the apparatus of FIG. 6 in response to normal and altered supply of blood to the localized myocardial section during the diastolic filling phase of the heart.
Figure 8:
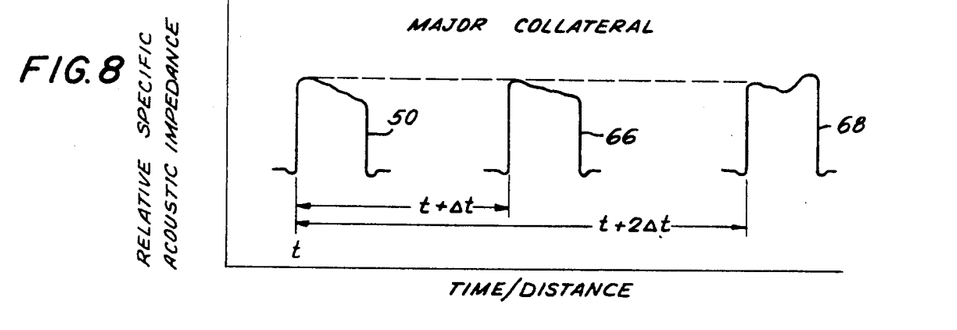
Figure 9:
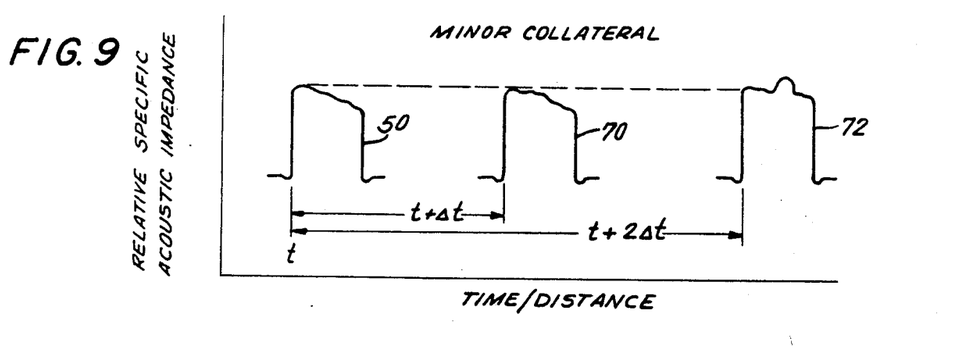
Figure 10:
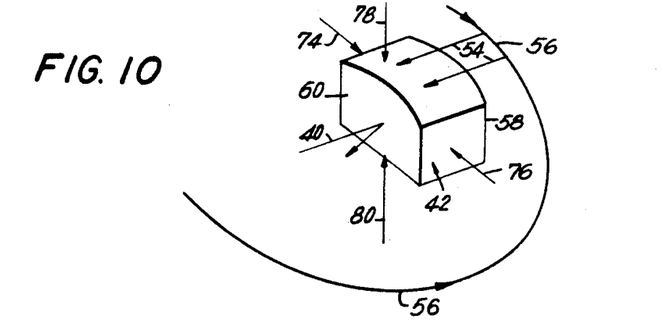
FIG. 10 is a perspective view of the localized myocardial section and illustrates the supply of blood thereto during diastole.

Acoustical interrogation as illustrated in FIG. 6 of the localized myocardial section 42 in real time during the diastolic filling phase to evaluate blood flow thereto is illustrated in FIGS. 7, 8 and 9, which are drawn to the same time and amplitude scales, and in FIG. 10 which illustrates alternate pathways of blood flow to the myocardial section of interest. The impedograms 50 of FIGS. 7, 8 and 9 represent the relative specific acoustical impedance of myocardial section 42 just at the beginning of the diastolic filling phase of the cardiac cycle. As the ventricle begins to fill with oxygenated blood supplied thereto from the pulmonary vein to thus enlarge the heart with resultant stretching and decrease in thickness of the myocardium, it may be understood that the impedograms which correspond in time therewith (as determined by the EKG) will clearly indicate the transmural changes of myocardial impedance which occur during this time of maximum blood flow of the coronary cycle. More specifically, and if the commencement of diastole is taken as time $t$, impedogram 52 of FIG. 7 which is taken at $t + \Delta t$ will be clearly representative of the myocardium under normal conditions in which the same is being fed primarily by the penetrating epicardial vessels 54 (FIG. 10) from the coronary arteries 56. Under these normal myocardial conditions, the resultant change in transmural impedance, which is illustrated as positive, will first appear as shown near the epicardial surface 58 and will progress in time toward the endocardial surface 60. Thus, at time $t + 2 \Delta t$, impedogram 62 will clearly indicate the progress of the blood, and the attendant progress of the increase in transmural impedance toward the endocardial surface 60.

In the event that blood flow to the localized myocardial section 42 under interrogation is altered, as by blockage or other malfunction in penetrating epicardial vessels 54 or in the supply of blood thereto, with the result that blood flow to said section occurs primarily as a result of major collateral flow, or return flow from coronary artery 56 in retrograde manner through epicardial vessels 54 or adjacent epicardial vessels (FIG. 10) and is delayed in time accordingly, this abnormality will be clearly indicated as shown by impedograms 66 and 68 of FIG. 8. More specifically, impedogram 66 clearly indicates that at time $t + \Delta t$ no appreciable blood flow to myocardial section 42 has yet occurred, while impedogram 68 which is taken at time $t + 2\Delta t$ clearly indicates that such blood flow has begun only after the delay occasioned by the malfunction of epicardial vessels 54 or the supply of blood thereto from the relevant coronary artery and is thus of primarily major collateral rather than direct origin.

Impedograms 70 and 72 of FIG. 9 illustrate an abnormal myocardial condition during diastole, again through time reference to the EKG, in which the changes in myocardial impedance first occur away from the epicardial surface and are again somewhat delayed in time to thus clearly indicate that the blood flow to localized section 42 is of minor collateral origin only. By this is meant that such blood flow does not commence as it should from the epicardial vessels 54 near the eipcardial surface 58, but rather, occurs primarily only circumferentially from adjacent myocardial sections as represented by 74, 76, 78 and 80 in FIG. 10, and has its primary origin from the epicardial vessels which penetrate said adjacent sections.

The above description of FIGS. 7, 8 9 and 10 is believed to make clear that alterations in the normal myocardial blood flow from the epicardial to the endocardial surfaces may be readily detected through utilization of the methodology and apparatus of the invention, not only by noting the changes in average impedance of the impedograms 66, 68, 70 and 72, but also by noting the direction of such changes. Further, the observation and comparison of impedograms taken as above on the patient under stressed and relaxed conditions can provide direct evidence of alterations of localized blood flow which may be associated with relative ischemic conditions. Too, it is believed clear that acoustical interrogation as above of a number of localized myocardial sections will enable the ready determination of the relative transmural blood flow of each of said sections, through comparison of the overall increases in impedance presented thereby, and of the relative duration of each of said blood flows, through comparison of the durations of said impedance increases.

At the completion of the diastolic phase, the depolarization current will arrive at the localized myocardial section 42 to commence the systolic phase of the cardial cycle beginning with the isometric contraction of the myocardium followed by the contraction phase of the ventricle and attendant ejection of the blood from the ventricle through the aortic valve. In the absence of infarction, advanced ischemia or other abnormalities in the localized myocardial section 42 of interest, it may be understood that the impedogram thereof just prior to the arrival of said depolarization current will take the form of that depicted at 82 in FIG. 11. As the depolarization current reaches said section, as determined by the time referencing to the EKG, the tensing or active contraction thereof in accordance with what is generally referred to as the "time-tension" effect, will result in decrease in the thickness of the section and transmural increase in section impedance, both as discussed hereinabove and as clearly indicated by impedogram 84 of FIG. 11.

Figure 11:
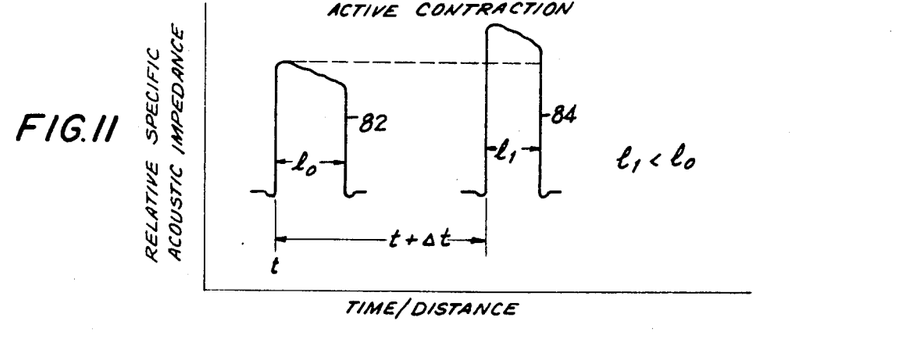
FIGS. 11, 12 and 13 are respectively diagrams of the impedograms provided by the apparatus of FIG. 6 in response to normal and altered response of the localized myocardial section to the depolarization current at FIG. 14 illustrates the plurality of impedograms which would, in the absence of appropriate blanking, be provided by ensonification of a localized posterior myocardial section through the sternum.
Figure 12:
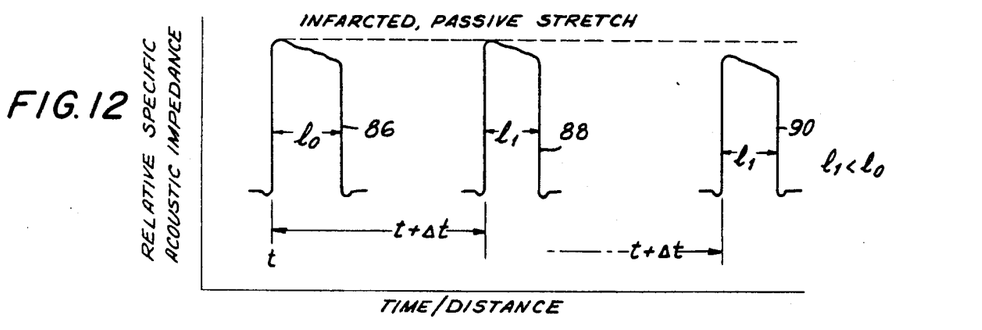

In the event, however, that said section is infarcted or scarred to thus present a higher initial impedance due to the greater density thereof, this condition will be clearly indicated by impedogram 86 of FIG. 12 which may readily be seen to be of higher average amplitude than impedogram 82 of FIG. 11 (normal myocardium). In this instance, the infarcted condition of the myocardial section of interest will prevent the active contraction thereof upon the arrival of the depolarization pulse. The active contraction of the adjacent, non-diseased myocardial sections will, however, result in the passive stretching of the section of interest with attendant decrease in the thickness thereof, and this will be illustrated by the fact that the impedance of the latter will remain substantially unchanged as clearly indicated by impedogram 88, or will alternatively decrease as clearly indicated by impedogram 90.

Figure 13:
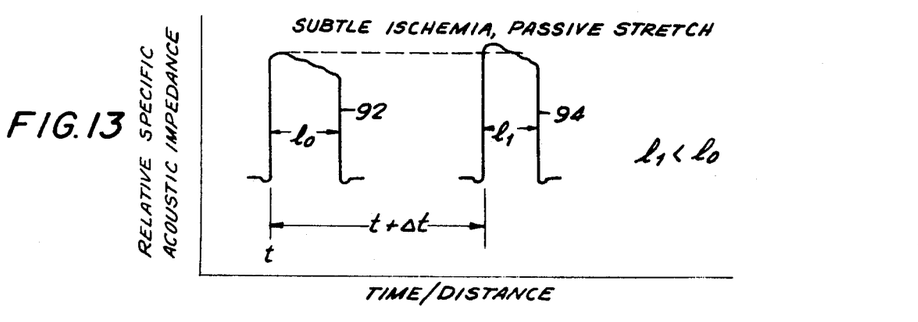

If the localized myocardial section 42 under acoustical interrogation at the commencement of systole is affected with early ischemia or somewhat reduced blood supply from the coronary arteries and/or penetrating epicardial vessels, it may be understood that, although the initial impedance thereof may be substantially the same as that of a normal section of myocardium as clearly indicated by impedogram 92 of FIG. 13, the ability of this slightly ischemic myocardial section to undergo active contraction in response to the depolarization current will be somewhat diminished, and this will be clearly indicated by impedogram 94 which displays a lesser increase in impedance than that displayed by impedogram 84 of the normal myocardial section of FIG. 11.

Since the thickness of the localized myocardial section at different times during the systolic phase is a readily available parameter from the impedograms of FIGS. 11, 12 and 13, it may be understood that the application of simple differentiation techniques thereto will be effective to provide real time values for myocardial wall velocity and acceleration as related to the cardiac cycle by the EKG time reference. As a result, the force of myocardial contraction can be calculated with attendant calculation of the overall force produced in the ventricle during any portion of the ejection phase of the cardiac cycle.

The utilizations of the methodology and apparatus of the invention as respectively described hereinabove with regard to FIGS. 7, 8, and 9 and 10, and with regard to FIGS. 11, 12 and 13, are, of course, conjunctive. This is to say that the relative specific acoustical impedance relationships developed as described during the diastolic phase may and will be compared and interrelated with said impedance relationships developed as described during the systolic phase to result in particularly exact, noninvasive evaluation of overall heart contractility. Thus, for example, if a particular localized myocardial section under acoustical interrogation is detected which, during diastolic filling, has no epicardial impedance peak and which, during systole or isometric contraction exhibits a higher initial impedance than that of adjacent myocardial sections and one which diminishes rather than increases upon the arrival of the depolarization pulse, it can be determined with a high degree of certainty that said myocardial section is afflicted with irreversible tissue damage and an associated obstruction of the penetrating epicardial vessel or relevant coronary artery.

Figure 14:
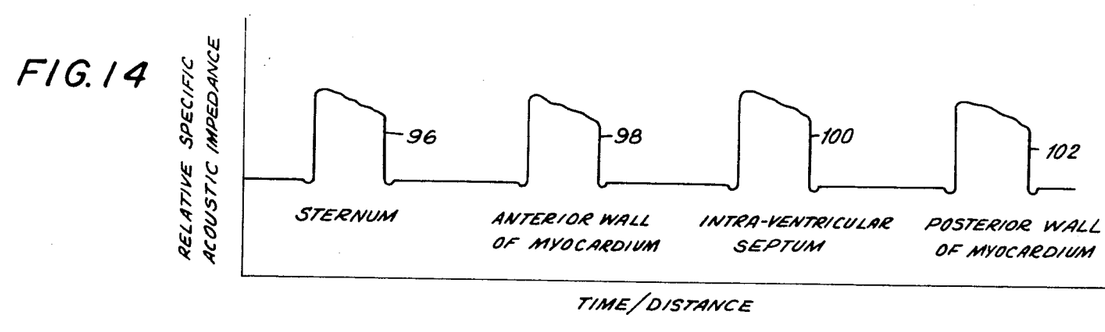

Ensonification of the posterior myocardial wall as depicted in FIG. 6 will, of course, result in echoes or return signals and attendant impedograms being produced by, for example, the non-illustrated sternum, the anterior myocardial wall, the septum and the posterior myocardial wall of interest as illustrated respectively at 96, 98, 100 and 102 in FIG. 14. By appropriate time gating, any desired portions of FIG. 14 may of course be isolated for display on the oscilloscope whereby may be understood that isolation of impedogram 102 in the given example may be readily effected to enable examination of the section of the posterior myocardial wall of interest, only. Too, since the impedogram of interest is, in each instance, updated at intervals which are equal to or less than a cardiac period, it will be possible to examine the impedogram of the isolated cardiac portion in any desired fixed phase relationship to the cardiac cycle through appropriate time referencing to the EKG.

Figure 15:
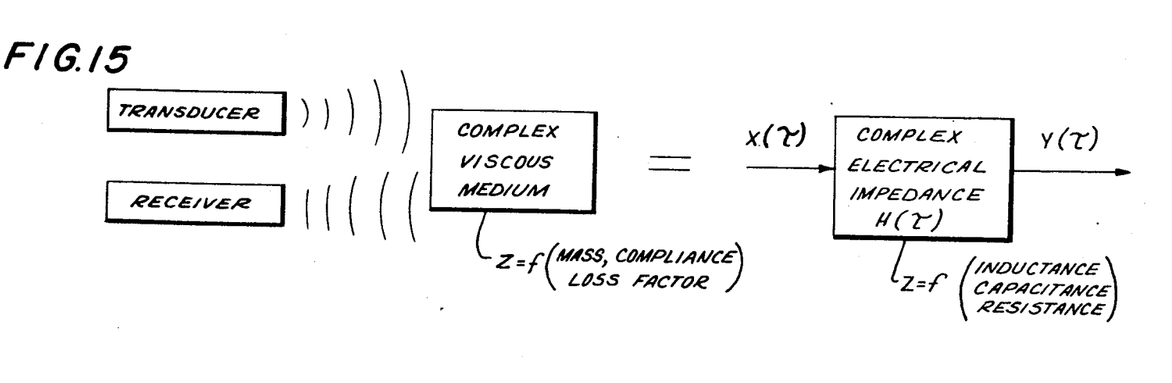
FIG. 15 illustrates the synthesis of an equivalent electrical impedance network.
Figure 16:
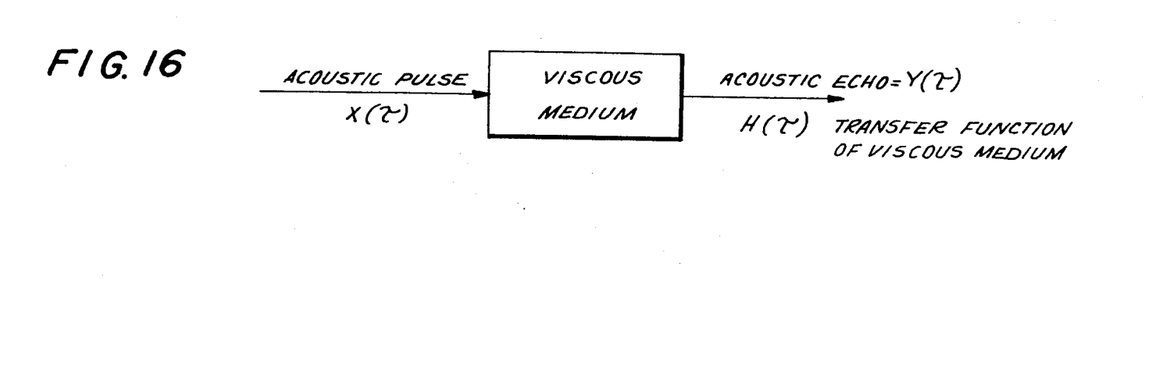
FIG. 16 illustrates an acoustic pulse-echo model.

The signal processing computer of the invention for calculating specific acoustical impedance as a function of distance is operable on the basis of network synthesis through the assumption that the propogation of acoustical energy through a visco-elastic medium, and examination of the resultant echo signals to synthesize the medium, is equivalent to the electrical pulsing of a network of complex electrical impedances and the examination of th network output to synthesize the network as illustrated in FIG. 15. From this illustration, and using the model of FIG. 16, it may then be determined from transform theory that EQUATION (1) $Y(t) = \int_0^t X(\tau) H(t-\tau) d\tau$ This can be implemented by solving for the terms of $H(t)$ from the summation.

EQUATION (2) $Y(t) = \sum_{n=0}^{n=t} X_n(\tau) H t - n(\tau) \Delta \tau$

Upon writing some of these terms and solving for $Hn(t)$ it may be determined that each $H_n(t)$ term becomes a function of constants dependent on $X_n(\tau)$ and the previous values of $H_n(t)$ as follows:

EQUATION 3:
$H_o = XY_o - 0$
$H_1 = X_1 Y_1 - (X_2 H_0)$
$H_2 = X_1 Y_2 - (X_2 H_1 + X_3 H_0)$
$H_3 = X_1 Y_3 - (X_2 H_2 + X_3 H_1 + X_4 H_0)$
$H_n = X_1 Y_n - (X_2 H_{n-1} + X_3 H_{n-2} + ... + X_{n+1} H_0)$
where:
EQUATION 4:
$X_1 = (1/X_0) \Delta \tau$
$X_2 = X_1/X_0$
$X_3 = X_2/X_0$
$X_n = X_{n-1}/X_0$ As can be seen from Equation 3, each calculation of $H_n(t)$ requires only the knowledge of one specific echo sample plus the previously calculated value of $H_n(t)$.

It can also be seen that the time integral of $H_n(t)$ is a function of the relative specific acoustic impedance of the medium i.e.

EQUATION (5) $\int_0^t H(t) dt = f\left(\frac{Z(t)}{Z_0}\right)$ where $Z(t)$ is the impedance of the medium and $Z_0$ is an arbitrary reference impedance.

It can further be shown that:

EQUATION (6) $\dfrac{Z(t)}{Z_0} = \dfrac{1 + \int_0^t H(t) dt}{1 - \int_0^t H(t) dt}$ Thus, the signal processing electronics will calculate $H_n(t)$ by Equations 3 and 4, integrate the waveform thus calculated and display this as relative specific acoustic impedance of the ensonified medium.

Figure 17:
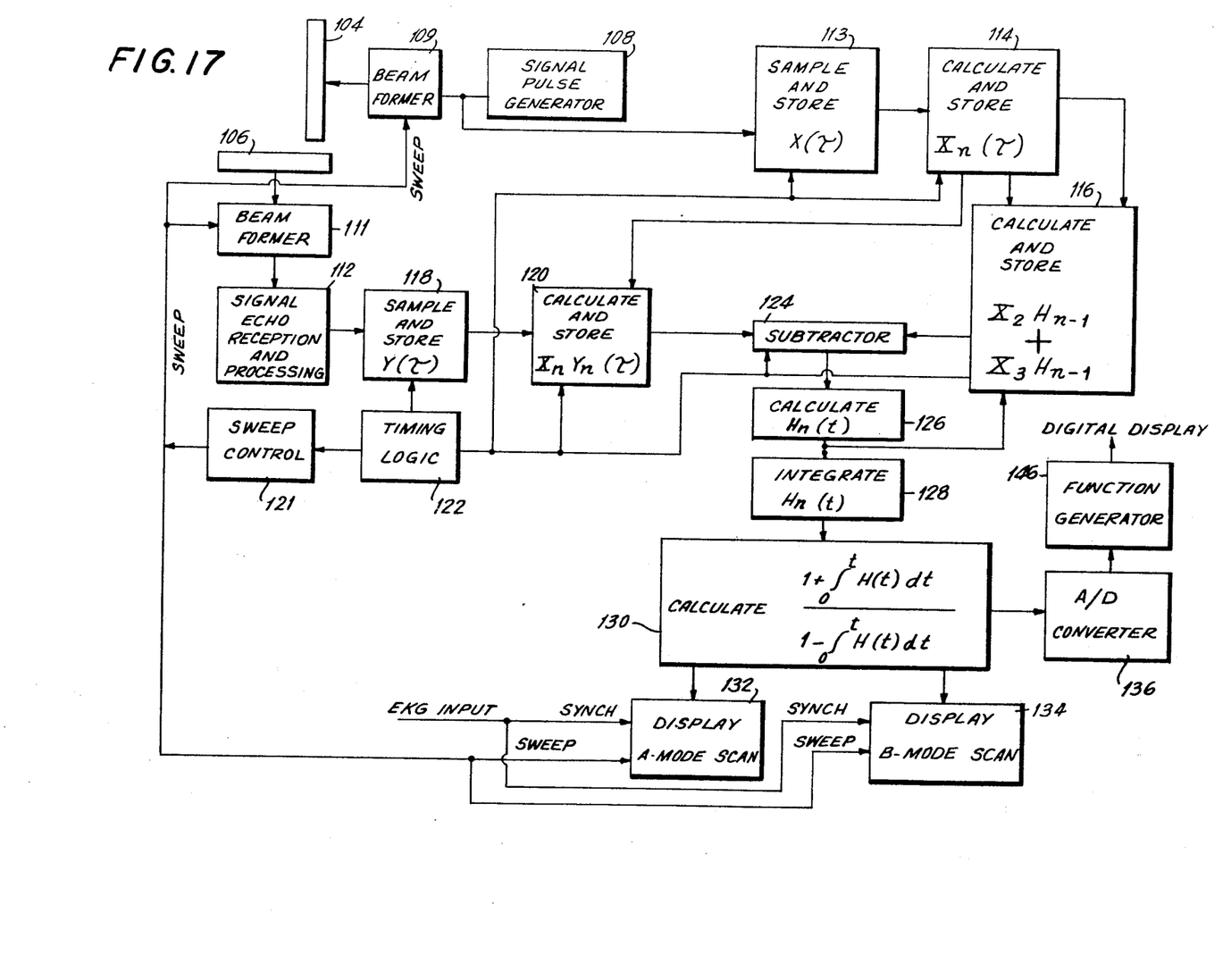
FIG. 17 is a block diagram of signal generation, transducer, and signal processing computer means constructed and operative in accordance with the invention.

FIG. 17 is a functional block diagram of the signal generation, transducer, and signal processing computer system which is operable in accordance with the teachings of the invention to accomplish the above by analog techniques. Additionally, the system shown includes the capability of scanning both the transmitting beam and receiving beam so that with time gating the B-scan display can be used to show ensonified regions parallel or perpendicular to the acoustic beams. More specifically, and referrin now to said FIG. 17, the transducer may be seen to comprise a linear transmitting array 104 and a linear receiving array 106 which are generally perpendicularly oriented in the manner of a Mills T, for maximum spatial information, and which can be utilized, through appropriate electronic beam steering techniques as well known to those skilled in this art, to acoustically interrogate small areas as determined by the area of intersection of the propogated acoustic beams. Alternatively, said beams can be electronically steered to acoustically interrogate a generally line-like area (i.e. beams are fixed), or to acoustically interrogate a planar area perpendicular or parallel to the direction of ensonification. Alternatively, a matrix array or mechanically manipulated single narrow beam transducer may of course be utilized.

Figure 19:
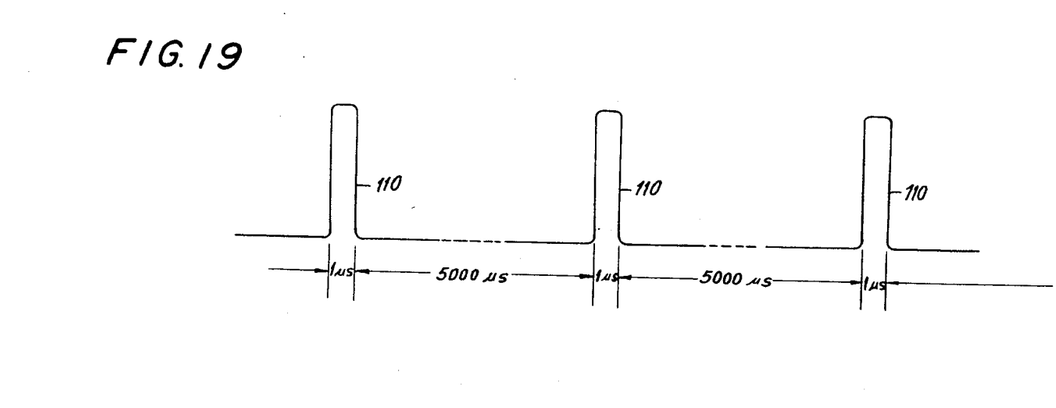
FIG. 19 is a graph of the broad band acoustic pulses generated by the system of the invention.

The pulse source 108 is effective to generate broad band width pulses 110 of FIG. 19 which are formed and steered by beam formation means 109. For use in cardiovascular acoustical interrogation, the pulses 110 might, for example be of 1 microsecond duration and occur every 5000 microseconds to, in conjunction with an EKG of 60 per minute, refresh the impedogram 200 times per EKG pulse to insure the capabiltiy of the impedogram to clearly indicate changes in cardiovascular characteristics of relatively short time duration.

The sample and store means 113, and function calculating and store means 114, are respectively operable to sample and store each transmitted pulse 110 and to calculate and store the transmitted pulse ration functions $\overline{X}_n(\tau)$ thereof, while function calculate and store means 116 are operable to sequentially calculate the respective functions of said transmitted pulse ratios and the previously calculated acoustical transfer functions $H_n$ and to store the same. Thus, some time after the reception of the first echo pulse $\overline{Y}(\tau)$ by sample and store means 118, calculate and store means 120 will contain in storage the functions of the preceeding transmitted pulse rations $\overline{X}_n(\tau)$. Thus, as each succeeding echo pulse $\overline{Y}_n(\tau)$ is received by receiver 112, the same will be applied as indicated from sample and store means 118 to calculate and store means 120 for multiplication as indicated with the appropriate transmitted pulse ratio, and the products of such multiplication and the transmitted pulse ratio and transfer functions from calculate and store means 116 will be applied as indicated, in proper sequence under the control of timing logic means 122, to subtractor 124 for subtraction in each instance of the former from the latter.

The results of such subtractions are applied as indicated to calculator means 126 and operated upon in accordance with Equation 3 to provide the transfer function as a function of time, or $H_n(t)$. This transfer function is then integrated by integrator 128 and the resultant integral applied as indicated to calculator means 130 for provision of an analog signal indicative of the relative specific acoustical impedance namely, $$\dfrac{1 + \int_0^t H(t) dt}{1 - \int_0^t H(t) dt}$$

in accordance with Equation 6. This signal is then applied as indicated to oscilloscope 132 for display of the impedogram of interest as an A-mode scan, and to oscilloscope 134 for display of the same as a B-mode scan with Z axis modulation.

An analog to digital converter 136 and function generator 146 may be included as indicated to provide digital readouts of the various generated functions for appropriate digital display on oscilloscopes 132 and/or 134.

Figure 18:
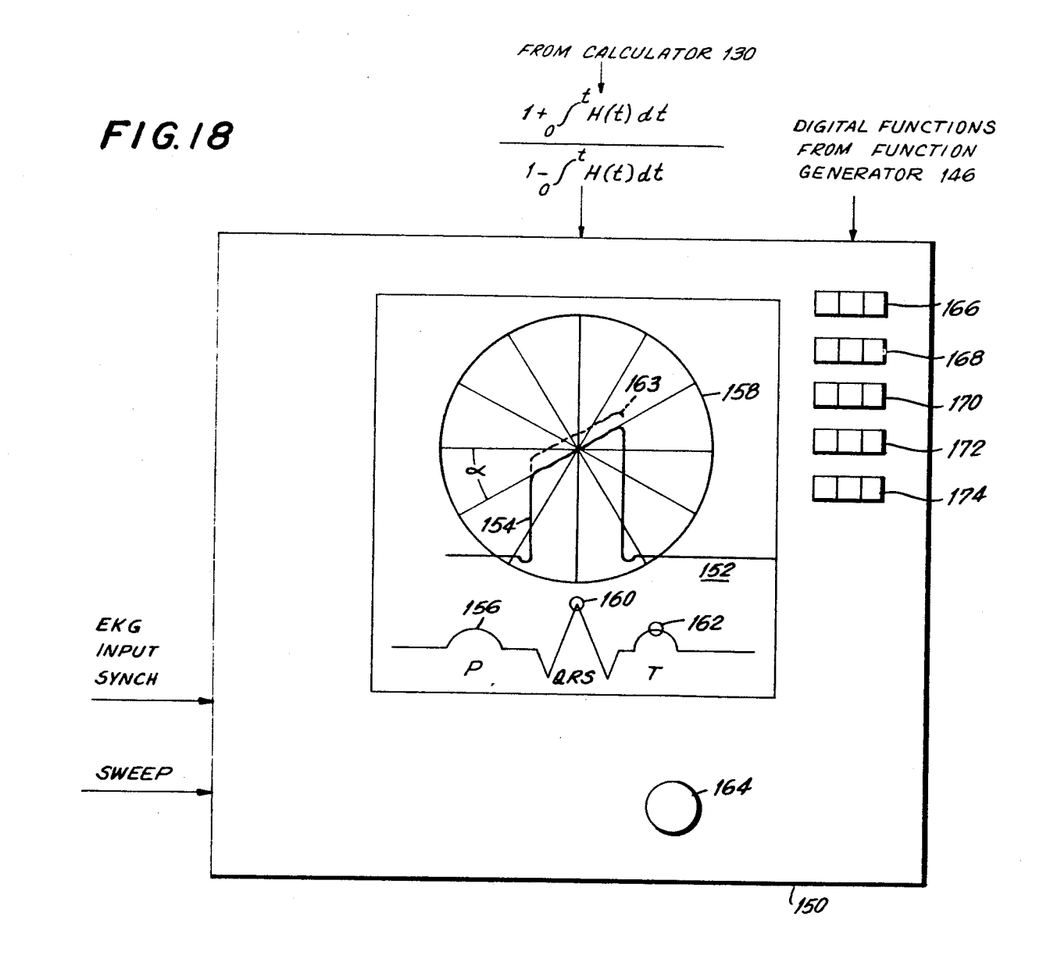
FIG. 18 illustrates the frontal panel of an oscilloscope for use in the system of FIG. 17.

A representatively configured display panel for use with the system of FIG. 17 is frontally illustrated at 150 in FIG. 18 and may, for example, include a Tektronix Model 7514 storage oscilloscope which is operable to provide a display including two different chopped time bases in a delayed mode. The display panel 150 comprises a CRT face 152 on which are concomitantly displayed as shown an impedogram 154 of a localized myocardial section of interest and the EKG waveform 156. A polar overlay 158 is oriented as shown over the CRT face 152 to enable direct visual approximation of the slope $\alpha$ of impedogram 154.

A cursor position selection switch 164 is provided on the frontal panel of the display panel 150 and is operable to enable the selection of the point in time during the cardiac cycle at which impedogram display is desired. Thus, for example, with the switch 164 in one position thereof, it may be understood that the displayed impedogram 154 will be that which occurs at the peak of the QRS or ventricular depolarization phase of the cardiac cycle, and that this fact will be clearly indicated to the operator by a continually refreshed blip 160 or the like which will occur as shown at the appropriate point on the EKG waveform 156. Alternatively, and with switch 164 in a different position thereof, impedogram 163 will be displayed, and this impedogram will be that which occurs at the peak of the T or ventricular repolarization phase of the cardiac cycle as will be clearly indicated by the blip 162 on EKG waveform 156. Cursor position selection switch is, of course, moveable through a range of positions which is sufficient to enable the display of the impedogram which will occur at any point in the cardiac cycle, and as well, in each instance, be clearly indicated by the blip on the EKG waveform. As a result, positive determination of the relationship between the displayed waveform and the cardiac cycle phase, and rapid and convenient switching therebetween for purposes of advantageous impedogram comparison, as discussed hereinabove, are made possible.

Three digit digital displays are provided as indicated at 166, 168, 170, 172 and 174 on the frontal panel of display panel 150 and are respectively operable to digitally display the functions from function generator 146 (FIG. 17). More specifically, display 166 is operable to indicate S (the time/distance extent of impedogram 154), display 168 is operable to indicate $ds/dt$ (the velocity of change in S), display 170 is operable to indicate $d^2s/dt^2$ (the acceleration of the change in S), display 172 is operable to indicate the slope $\alpha$ (the rate of change in impedance), while display 174 is operable to indicate $dx/dt$ (the acceleration in the rate of impedance change).

Figure 20:
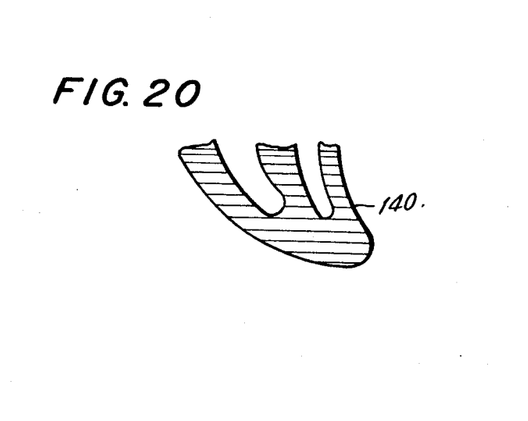
FIGS. 20 and 21 are respectively diagrams of the displays of vertical and horizontal heart sections as can be provided by the invention.
Figure 21:
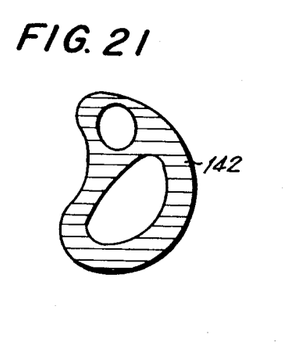

Through proper electronic steering of the acoustical signal pulses from transmitting array 104, and appropriate Z axis modulation, it may be understood that, as applied to the heart, a B-mode scan may be provided on display panel 150 to display a profile of the ensonified region in the plane of the scanning beam or parallel to its direction. Thus, if the acoustic pulses are scanned vertically through the heart, the B-mode scan could display the vertical heart section 140 of FIG. 20. Alternatively, and with horizontal scanning by the acoustical pulses, the B-mode scan could display the horizontal heart section 142 of FIG. 21. In each instance, said sections will constitute dynamic non-invasively obtained, high resolution real time displays of a live heart in situ with attendant particularly significant advantages as must be obvious to all skilled in this art. Thus, for example, dyskinesia could be readily diagnosed through use of the scans of FIGS. 20 and 21.

Although disclosed hereinabove by way of illustrative example as applied to significant advantage to cardiovascular diagnosis, it is believed clear that the methodology and apparatus of the invention would be equally applicable to commensurate advantage in a wide variety of other and different biophysical areas and to the non-invasive examination of a wide variety of other and different body parts, it being understood that the term "body parts" as utilized herein is intended to cover the body organs plus the other body components in the nature, for example, of muscles. These other and different biophysical areas might, for example, include the neurological, the neuromuscular, the urological, the obstetrical and gynecological, the abdominal, and the opthalmological.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In a method for the non-invasive examination of body parts, the steps of, selectively ensonifying at least a portion of a body part with broad band acoustic energy pulses in predetermined timed sequence to produce echo pulses, detecting said echo pulses, processing said echo pulses to indicate the relative specific acoustic impedance of the thusly ensonified body part portion as a continuous function of the time/distance relationship of said echo pulses relative to said body part portion to thereby enable the determination of the relative extent and location of irregularities in said body part portion, and referencing said relative specific acoustic impedance indications to the bio-physical cycle of the thusly ensonified body part portion to thereby enable the correlation of said relative specific impedance indications and said biophysical cycle.

2. In a method as in claim 1 wherein, the impedance of said body part portion to said energy pulses is indicated in real time.

3. In a method as in claim 1 further comprising, the steps of, displaying said impedance indications to provide an impedance profile of the thusly ensonified body part portion.

4. In a method as in claim 3 further comprising, the steps of, spatially scanning said body part to accumulate said impedance profiles, and spatially displaying the impedance profiles resulting from each of said scans to provide a visualization of said body part.

5. In a method as in claim 1 further comprising, the steps of, comparing said impedance indications at different times in the biophysical cycle of the thusly ensonified body part.

6. In a method as in claim 1 wherein, the processing of said echo pulses comprises, the steps of, converting the same into electrical signals indicative of said impedance, and displaying the latter in the form of an impedance profile.

7. In a method as in claim 6 further comprising, the steps of, spatially scanning said body part to accumulate said electrical signals, and spatially displaying the electrical signals resulting from each of said scans to provide a visualization of said body part.

8. In a method for non-invasive cardiovascular diagnosis to determine the contractility of the heart, the steps of, selectively ensonfiying a localized section of the myocardium with broad band acoustic energy pulses in predetermined timed sequence to produce echo pulses, detecting said echo pulses, processing said echo pulses to convert the same to electrical signals which are indicative of the relative specific acoustic impedance of the thusly ensonified myocardial section as a continuous function of the time/distance relationship of said echo pulses relative to said myocardial section, time referencing said signals to the EKG of the heart, and displaying said signals in real time on a CRT or like display device to provide an impedance profile of said localized myocardial section to thereby enable the determination of irregularities in the nature of infarction or ischemia in said section and the patterns of blood flow thereto.

9. In a method as in claim 8 wherein, the displaying of said signals comprises the display thereof in real time on a display device.

10. In a method as in claim 8 wherein, said impedance profiles are displayed at the commencement of the diastolic filling phase of the cardiac cycle to enable the detection and quantification of blood flow to said localized myocardial section.

11. In a method as in claim 8 wherein, said impedance profiles are displayed at the commencement of the systolic isometric contraction phase of the cardiac cycle to enable the detection and quantification of, and the differentiation between, active contraction and passive stretch of said localized myocardial section to determine the contractility of the heart.

12. In a method for the non-invasive examination of body parts, the steps of, spatially scanning a body part by sequentially and selectively ensonifying along displaced generally parallel planes different localized sections of at least a portion of said body part with broad band acoustic energy pulses in predetermined timed sequence to produce echo pulses, detecting said echo pulses, processing said echo pulses to convert the same to electrical signals indicative of the relative specific acoustic impedance of the thusly ensonified body part portion as a continuous function of the time/distance relationship of said echo pulses relative to said body part portion, accumulating said electrical signals, and spatially displaying the electrical signals resulting from each of said scans on a CRT or like display device to provide a visualization of said body part portion and thereby enable the determination of the configuration, and of the relative extent and position, of irregularities in said body part portion.

13. In a method as in claim 12 wherein, said electrical signals are displayed in real time on a display device.

14. In apparatus for the non-invasive examination of body parts, means for selectively ensonifying at least a portion of a body part with broad band acoustic energy pulses in predetermined timed sequence to produce echo pulses, means for detecting said echo pulses, means for processing said echo pulses to indicate the relative specific acoustic impedance of the thusly ensonified body part portion as a continuous function of the time/distance relationship of said echo pulses relative to said body part portion to thereby enable the determination of the relative extent and position of irregularities in said body part portion, and means for referencing said impedance indications to the biophysical cycle of the thusly ensonified body part portion to thereby enable the correlation of said relative specific impedance indications and said biophysical cycle.

15. Apparatus as in claim 14 wherein, said means to provide said impedance indications are operative to provide the same in real time.

16. Apparatus as in claim 14 further comprising, means to display said impedance indications to provide an impedance profile of the thusly ensonified body part portion.

17. Apparatus as in claim 16 wherein, said display means comprise means to compare said impedance profiles at different points in the biophysical cycle of said body part.

18. Apparatus as in claim 16 further comprising, means to spatially scan said body part to accumulate said impedance profiles, and means for spatially displaying the impedance profile resulting from each of said means to provide a visualization of said body part.

19. Apparatus as in claim 14 wherein, said echo pulse processing means comprise means to convert the same into electrical signals indicative of said impedance, and said apparatus further comprise display means for displaying said electrical signals in the form of an impedance profile of said body part portion.

20. Apparatus as in claim 18 further comprising, means for spatially scanning said body part to accumulate said electrical signals, and means for spatially displaying the electrical signals resulting from each of said scans to provide a visualization of said body part.

21. Apparatus as in claim 20 wherein, said display means include a CRT.

* * * * *